United States Patent [19]

Rubenstein et al.

[11] 4,006,312
[45] Feb. 1, 1977

[54] SOUND RECORDING AND REPRODUCING MACHINES

[76] Inventors: Leonard Rubenstein, 27 Chessington Court, London N.3; Stephen Perrin Robinson, Lyon Way, Frimley Road, Camberley, Surrey, both of England

[22] Filed: Jan. 8, 1975

[21] Appl. No.: 539,591

Related U.S. Application Data

[63] Continuation-in-part of Ser. No. 523,535, Nov. 13, 1974, abandoned.

[30] Foreign Application Priority Data

Nov. 14, 1973 United Kingdom ............ 52793/73
May 14, 1974 United Kingdom ............ 21368/74

[52] U.S. Cl. .............................................. 179/6 R
[51] Int. Cl.² ...................................... H04M 11/00
[58] Field of Search ............... 179/6 R, 6 AC, 6 E, 179/2 A; 360/72, 74

[56] References Cited
UNITED STATES PATENTS

| | | | |
|---|---|---|---|
| 2,937,237 | 5/1960 | Zanardo | 179/6 AC |
| 3,527,893 | 9/1970 | Honobe | 179/6 AC |
| 3,590,159 | 6/1971 | Wolf | 179/6 R |
| 3,730,997 | 5/1973 | Konno | 179/6 R |
| 3,825,687 | 7/1974 | Waldman | 179/6 E |
| 3,865,987 | 2/1975 | Yamamoto | 179/6 R |
| 3,887,773 | 6/1975 | Urayama | 179/6 R |
| 3,894,188 | 7/1975 | Konno | 179/6 E |

*Primary Examiner*—Daryl W. Cook
*Assistant Examiner*—Robert M. Kilgore
*Attorney, Agent, or Firm*—Browdy & Neimark

[57] ABSTRACT

A sound recording and reproducing machine in which information is recorded in an endless recording medium in a series of tracks which extend lengthwise of the medium at locations mutually spaced in a direction laterally of the medium. When a plurality of electrical signals, each representing information, are applied to the machine the tracks are formed in a predetermined sequence. When a predetermined command signal is applied to the machine recorded information is reproduced from the tracks in the reverse order from the order in which the tracks were formed.

9 Claims, 7 Drawing Figures

SOUND RECORDING AND REPRODUCING MACHINES

This is a continuation in part of Ser. No. 523,535, filed Nov. 13, 1974, now abandoned.

This invention relates to sound recording and reproducing machines.

According to the invention a sound recording and reproducing machine in which information is recorded on an endless recording medium in a series of tracks which extend lengthwise of the medium at locations mutually spaced in a direction laterally of the medium comprises sound recording and reproducing means, means for driving the recording medium along a predetermined path within which information is recorded on, or reproduced from, the medium by the recording and reproducing means, and control means adapted, when a plurality of electrical signals each representing information are applied to the machine in sequence, to actuate the driving means and the sound recording and reproducing means so that the said tracks are formed in a predetermined order, and further adapted, when an electrical command signal for reproducing the information is applied to the machine, to actuate the driving means and the sound recording and reproducing means so that the recorded information is reproduced from the tracks in the reverse order from the order in which the tracks were formed.

Preferably, the sound recording and reproducing means comprise a first sound recording and reproducing head for use in forming the said tracks of recorded information on the recording medium, and means are provided for effecting relative movement between the first head and the recording medium in a direction laterally of the medium.

Suitably the control means actuate the sound recording and reproducing means so that the information represented by each of the electrical signals is recorded on a respective one of the said tracks, the said means for effecting relative movement causing a stepwise relative movement between the first head and the recording medium between the formation of adjacent tracks and between the reproduction from adjacent tracks.

Suitably, the means for effecting relative movement comprise ratchet and pawl means coupled to the first recording and reproducing head, and means adapted, when one of the electrical signals is received, to operate the ratchet and pawl means in a first sense, thereby to cause relative movement in a predetermined direction between the first recording and reproducing head and the medium, and further adapted, when an electrical command signal is applied to the machine, to operate the ratchet and pawl means in a second, opposed sense, thereby to cause relative movement in the opposite direction between the first head and the medium.

Preferably, the control means are adapted, when the recorded information is being reproduced from the tracks in the reverse order and a further, predetermined command signal is applied thereto, to actuate the driving means and the sound recording and reproducing means so that information recorded on one or more tracks already reproduced is again reproduced.

According to the invention there is also provided a sound recording and reproducing machine in which information is recorded on an endless recording medium, the machine comprising a sound recording and reproducing head, means for driving the recording medium along a predetermined path within which information is recorded on or reproduced from the medium by the sound recording and reproducing head, a plurality of sensing means arranged at mutually spaced locations along the path of the recording medium, each sensing means being adapted to sense the passage of a predetermined section of the medium, and control means adapted, upon sensing of the said section by a sensing means, to cause a predetermined switching operation to be effected in the machine, which switching operation is determined by the condition of other parts of the control means.

Suitably, the predetermined section of the recording medium is provided with a conductive strip and each sensing means comprises a pair of electrical contacts which engage the medium and which are short circuited by the strip when the strip passes thereby.

Preferably, each electrical contact is upstanding from a printed circuit board in the control means.

The invention will now be described, by way of example, with reference to the accompanying drawings, in which.

Figure 1:
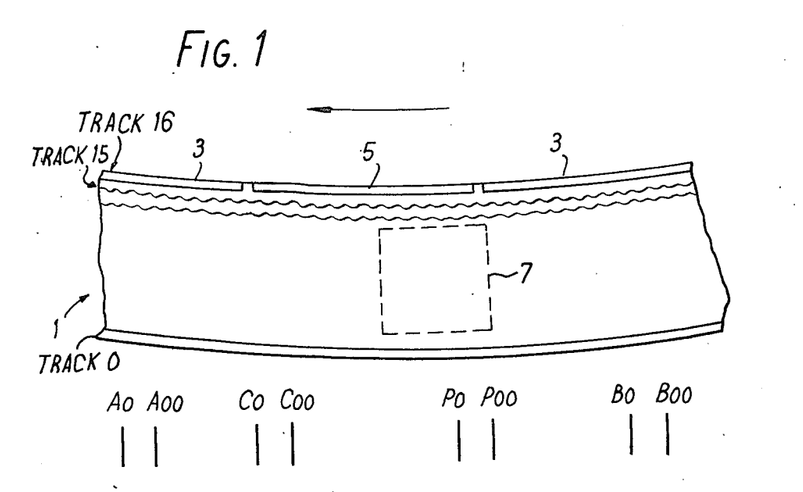
FIG. 1 is a section of the tape used in a machine according to the invention.
Figure 2:
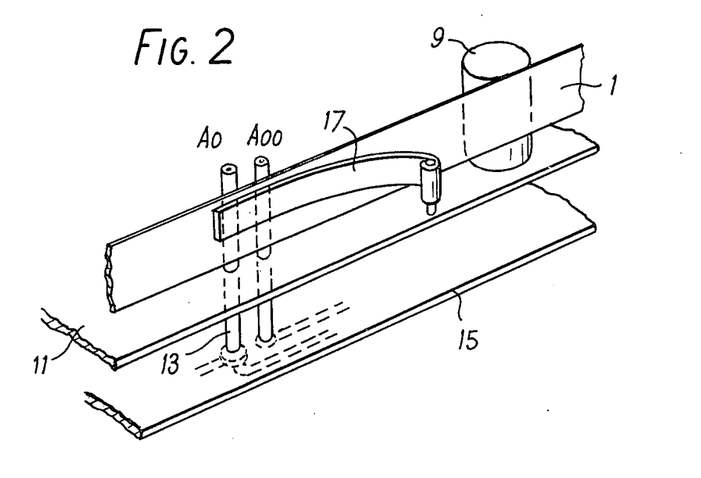
FIG. 2 is a diagrammatic perspective view of part of a tape deck in a machine according to the invention.
Figure 3:
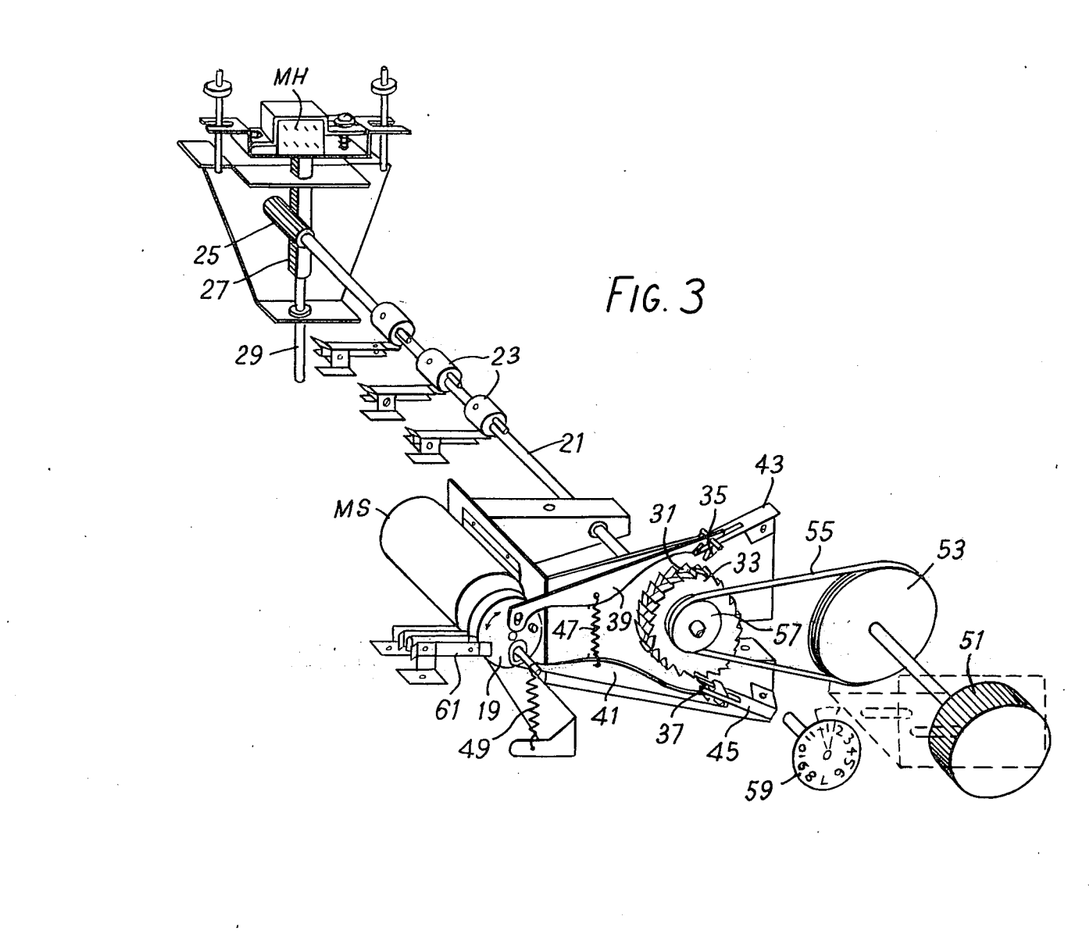
FIG. 3 is a perspective view of a mechansim for effecting movement of a sound recording and reproducing head in the machine of FIG. 2.
Figure 4:
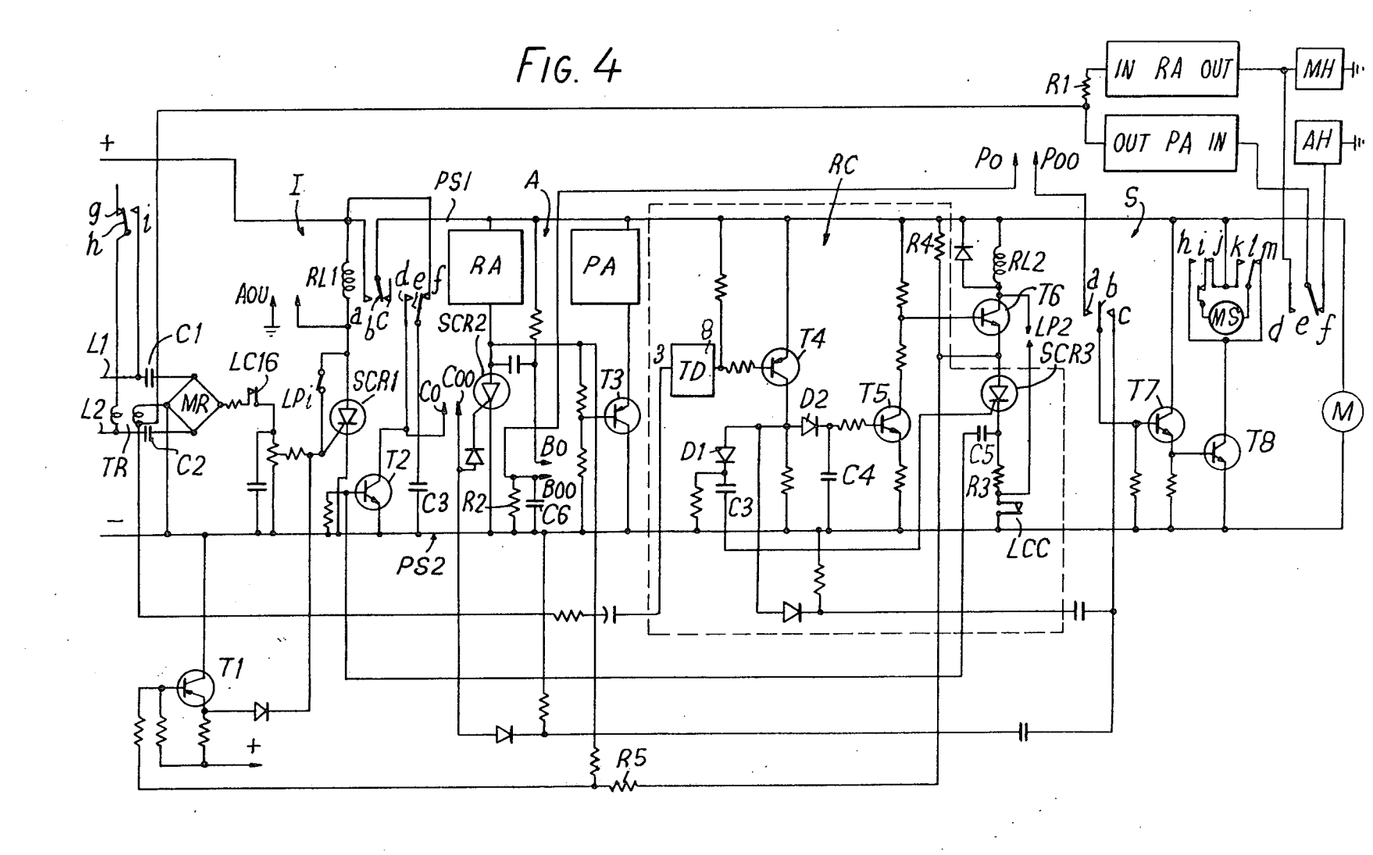
FIG. 4 is an electrical circuit in the machine of FIGS. 1 and 2.

The sound recording and reproducing machine shown in FIGS. 2, 3 and 4 of the drawings is a telephone answering machine for use with an endless tape of the form shown in FIG. 1, this tape being one upon which announcement texts and a series of fifteen incoming messages can be recorded. Recorded messages can be played back in the reverse order by the owner of the machine, either by operating controls provided on the machine or by telephoning into the machine by dialling his own number from a remote location.

Referring to FIG. 1, an endless magnetic tape 1 for use in the present machine is approximately sixty inches long and half an inch wide. The tape 1 is adapted to receive a series of sixteen tracks, tracks 1 to 16, of recorded information, the tracks extending lengthwise of the tape in mutually spaced parallel relationship. One of the sixteen tracks, track 16, is reserved for recording a telephone answering text made up of an opening text 3 and a closing text 5 and fifteen tracks, tracks 1 to 15, are available for recording incoming messages. There is one blank track, track 0. Also provided on the tape is a tranversely extending metal strip 7 which is used to actuate the machine to perform a series of switching operations, as hereinafter described.

Referring to FIG. 2, the endless tape 1 is arranged in the form of a loop which extends around a series of pillars 9 upstanding from a tape deck 11 in the machine. The tape 1 is arranged so that each recorded track is disposed in a horizontal plane. Each pillar 9 is coated with P.T.F.E., graphite or silicone compounds to reduce friction. For driving the tape 1 around the path defined by the pillars 9 a motor M (shown in FIG. 4) is provided below the tape deck 11. The motor M is coupled to a flywheel at the lower end of a shaft (not shown) which extends upwardly through an aperture in the deck 11 and has a capstan (not shown) mounted at its upper end. In use, tape is engaged between the capstan and a pinch roller and, upon energisation of the motor M, is driven along the path.

Associated with the metal strip 7 on the tape 1, and included in the electrical control circuit of FIG. 4, are four pairs of electrical contacts, Ao Aoo, Co Coo, Po Poo. All four pairs of contacts are shown diagrammatically in FIG. 1 and contacts Ao and Aoo are shown in FIG. 2. Referring to FIG. 2, each of the contacts is formed by a rod 1 which is upstanding from a printed circuit board 15 forming part of the control circuit and mounted below the tape deck 11. Each rod 1 extends upwardly through an aperture in the tape deck 11 and contacts one surface of the tape 1. A pressure pad 17 maintains the tape in engagement with an associated pair of contacts. Each pair of contacts is short circuited by the metal strip 7 once during each movement of the tape along the path.

Contacts Ao Aoo are arranged adjacent to the beginning of the tape path i.e., adjacent to the beginning of opening text 3 when the machine is not in use. Assuming that the tape takes 30 seconds for a complete traverse of the path, contacts Bo Boo are disposed approximately 5 seconds from the end of the path and they are followed immediately by contacts Po Poo and then contacts Co Coo.

For recording the announcement text on the tape 1 a fixed recording head AH, shown in FIG. 4, is mounted on the tape deck 11 at a vertical location adjacent to the uppermost recording track, track 16, on the tape. For reproducing information recorded on tracks 1 to 15 a movable head MH, shown in FIGS. 3 and 4, is provided.

Referring to FIG. 3, the head MH is moved upwardly and downwardly to positions adjacent respective tracks 1 to 15 by operation of a stepping motor MS, which is mounted on a chassis below the tape deck 11. The motor MS is arranged so that a switching disc 19 secured to an output shaft thereof is disposed in a vertical plane. Extending parallel with the motor shaft is a switching shaft 21 upon which a series of switching cams 23 is mounted. Associated with each cam 2 is a leaf contact switch, as hereinafter described.

At the end of the switching shaft 21 remote from the motor MS there is a pinion 25 which engages a rack 27 secured to a rod 29 supporting the head MH. Secured to the opposite end of the switching shaft 21 are two ratchet wheels 31 and 33, respectively, the wheels being arranged with each tooth on the wheel 31 inclined in a clockwise sense relative to a radial line through the tooth and each tooth on the wheel 33 inclined in an anticlockwise direction, as viewed from the end of the shaft remote from the lead MH. A first pawl 35 is located above the ratchet wheel 31 and a second pawl 37 below the other wheel 33, the pawls 35 and 37 being secured to respective horizontally extending arms 39 and 41. The end of each arm 39, 41 remote from the associated pawl 35, 37 is pivotally connected to the switching disc 19 on the shaft of motor MS, connection between the disc and the two arms being effected at respective locations on the disc which are diametrically opposed. Each pawl 35, 37 is constrained for movement in a generally horizontal direction by engagement of a pin on the associated arm 39, 41 in a slot formed in an associated stationary guide 43, 45. A tension spring 47 connects together the two arms 39 and 41 at a location on each arm intermediate the associated pawl 35 or 37 and the pivot for the arm. The switching disc 19 is maintained at an angular position wherein each pawl 35 and 37 is disengaged from the associated ratchet wheel 31 or 33 by means of a spring 49 which extends between the disc and the chassis and urges the disc into a dead-centre position.

The arrangement of the switching disc 19, arms 39 and 41, pawls 35 and 37 and ratchet wheels 31 and 33 is such that rotation of the switching disc in a first sense moves the pawl 35 into engagement with the associated ratchet wheel 31, thereby rotating the wheel 31 and the switching shaft 21 through a predetermined small angle in a first sense. Engagement between the rack 27 and pinion 25 at the opposite end of the switching shaft 21 leads to a predetermined upwards movement of the head MH by an amount sufficient to move the head from a vertical location adjacent one recording track on the tape 1 to a location adjacent to the track immediately above. Rotation of the switching disc 19 in the reverse sence causes the other pawl 37 to engage the associated ratchet wheel 33. This rotates the switching shaft 21 through a small angle in the opposite sense, thereby to cause movement of the head MH downwardly from one recording track to the track immediately below.

To allow for manual movement of the movable head MH each pawl 35 and 37 is disengaged from the associated ratchet wheel 31 or 33 when the motor MS is not energised. For effecting manual movement a control knob 51 on the front of the machine is coupled via a pulley 53 and a rubber band 55 to a second pulley 57 which is secured to the switching shaft 21. A visual indication of the angular position of the switching shaft 21 is provided by an indicator wheel 59 secured to one end of the shaft.

Further leaf contact switches 61 are provided adjacent to the switching disc 19, these further switches being operated by pegs on the switching disc.

The motors M and MS, the head AH and MH and the contacts Ao Aoo, Co Coo, Po Poo and Bo Boo, referred to above, are connected together in the electrical control circuit of FIG. 4, which is provided below the tape deck 11.

Referring to FIG. 4, the control circuit includes first an input circuit I which serves to sense an incoming ringing current on a telephone line L1, L2 and, in response to such current causes power to be supplied to the remainder of the circuit. Secondly, there is an amplifier circuit A for controlling the supply of current to a recording amplifier RA and a playback amplifier PA. Each of these amplifiers is shown twice in FIG. 4, in one case with power supply lines connected thereto and in the other case with signal input and output lines connected. Thirdly, there is a remote control circuit RC which can be operated by the owner of the machine dialling in from a remote location. Finally, there are switching circuits S for varying the electrical connections to motors M and MS and the heads AH and MH.

The input circuit I of FIG. 3 includes a bridge rectifier MR which, in use, is connected to the line L1 L2 via capacitors C1 and C2. The output of the rectifier MR is connected via a leaf contact switch 16, which is one of the switches mentioned above, to the gate of a silicon controlled rectifier SCR1. Rectifier SCR1 and the winding of a relay RL1 are connected in series between the terminals of a battery (not shown in FIG. 3) and the junction between the rectifier and the winding is connected to earth potential via contacts Ao Aoo. Also coupled to the gate of rectifier SCR1 is the collector electrode of a transistor T1.

The relay RL1 has three groups of contacts a, b and c, d, e and f, and g, h and i.

Contacts a, b and c are used for making and breaking connection between the battery and the circuits A, RC and S, referred to above. Contacts d, e and f are for connecting one terminal of a storage capacitor C3 to the battery or to contact Co. Contacts g, h and i serve to make and break connection between a primary winding of a line transformer TR and the line L1 L2. A secondary winding of transformer TR is connected via a resistor R1 to the input of receiving amplifier RA and the output of this amplifier is connected to the moving head MH. The secondary winding is also connected to the output of playback amplifier PA.

A transistor T2 has its collector connected to the junction between contact d of relay RL1 and contact Co and its emitter connected to a negative supply line PS2 from the battery thereby to provide a discharge path for capacitor C3. The base of transistor T2 is connected via a capacitor C5 to the cathode of a silicon controlled rectifier SCR3 in the remote control circuit RC.

Contact Coo, which is at the output of input circuit I, is connected to the gate of a second silicon controlled rectifier SCR2 which is in the amplifier circuit A. Rectifier SCR2 is connected in series with the recording amplifier RA between a positive power supply line PS1, connected to contact b of relay RL1, and the negative supply line PS2. From the anode of rectifier SCR2 a connection is made first to the base of a transistor T3, which is connected in series with playback amplifier PA between lines PS1 and PS2. The anode of rectifier SCR2 is also connected via a capacitor to contact Bo, which in turn is connected via a resistor to the line PS1. Contact Boo is connected to line PS2, via a parallel circuit made up of a capacitor C6 and a resistor R2, and to contact Poo. Finally, there is a connection from the anode of rectifier SCR2 to the base of transistor T1 in input circuit I.

In the remote control circuit RC a tone detector circuit TD has an input 3 thereof connected to the secondary winding of the line transformer TR in the input circuit I. An output 8 of the detector circuit TD is connected to the base of a transistor T4 which has its emitter connected directly to the line PS1 and its collector connected via a resistor to the line PS2. The collector of transistor T4 is also connected via a diode D1 and a capacitor C8 to the gate of rectifier SCR3, referred to above, and via a further diode D2 to the base of a transistor T5. A storage capacitor C4 is connected between base of transistor T5 and the line PS2.

In the switching circuit S a winding of a relay RL2 is connected between the line PS1 and the collector of a transistor T6. The anode of the above-mentioned rectifier SCR3 is connected to the emitter of transistor T6 and the cathode of the rectifier is connected to line PS2 via a resistor R3 and a leaf contact switch 0, which is one of the switches referred to above. The base of transistor T6 is connected to a resistive network in the collector circuit of transistor T5 and the emitter of transistor T6 is connected via a resistor R4 to line PS1 and via a resistor R5 to the base of transistor T1 in input circuit I. Contacts LP2 of a local playback switch LP, hereinafter described, are connected between the winding of relay RL2 and leaf switch 0.

Relay RL2 has three groups of contacts a, b and c, d, e and f, h, i, j, k, l and m.

Contacts a, b and c are used for making connections between contact Po, contact Coo and the base of a transistor T7 in circuit S. The emitter of transistor T7 is connected to the base of a transistor T8.

Contacts d, e and f are for connecting the input of the playack amplifier PA to the moving head MH or fixed head AH.

Contacts h to m are for connecting the stepping motor MS and transistor T8 in series between the lines PS1 and PS2.

Motor M is permanently connected between lines PS1 and PS2.

In addition to the switches shown in FIG. 3 the control circuit includes further switches which are used in local operation of the machine, as hereinafter described.

In use, an opening text 3 and a closing text 5 are recorded on track 16 of the tape 1, as hereinafter described and the tape is arranged with the metal strip 7 just beyond the contacts Ao Aoo and the beginning of the opening text 3 just before contacts Ao Aoo, as shown in FIG. 1. The machine is connected to the line L1 L2 in a "stand-by" mode i.e., ready to receive an incoming message on the line. In the stand-by mode the battery is connected across relay RL1 and rectifier SCR1 but there is only a small leakage current through the rectifier and the relay is not energised. The contacts of relays RL1 and RL2 are in the condition shown in FIG. 3. The storage capacitor C3 is charged to the battery potential through the contacts e and f of relay RL1. Since the contacts a and b of relay RL1 are open, no power is supplied to the amplifiers RA and PA, the remote control circuit RC, or to the motors MS and M.

When a ringing current is applied to the lline L1 L2 as a result of an outside call, current flows to the bridge rectifier MR through the capacitors C1 and C2. A d.c. voltage is then developed at the output of the bridge MR and the voltage is applied from the bridge to the gate of the rectifier SCR1. Rectifier SCR1 conducts, relay RL1 is energised and the contacts of the relay are switched.

Thus, contacts h and i of the relay RL1 are closed to connect the primary winding of transformer TR across the line L1 L2. This provides a d.c. path which completes the loop to the telephone exchange. Contacts a and b of the relay RL1 are also closed so that the battery is connected to the power supply lines PS1 and PS2. This means that the motor M is energised to drive the tape 1 around the loop. At this stage the rectifier SCR2 is cut off, since no voltage is applied to the gate. Although there is a small current through the recording amplifier RA, via the resistors in the base circuit of transistor T3, this is insufficient for operation of the amplifier. This small current is sufficient to apply a positive bias to the base of transistor T3, however, and this transistor conducts. As a result current flows through the playback amplifier PA, which is energised. Finally, contacts d and e of the relay RL1 are closed and the charge stored on capacitor C3 is applied to contact Co.

Since the relay RL2 is not energised the fixed head AH is connected to the input of the playback amplifier PA via contacts e and f of the relay. The output to the playback amplifier PA is connected to line via transformer TR. With the motor M energised the machine operates to playback the opening announcement text 3 recorded on track 16 of the tape 1 to the line L1 L2.

When the tape 1 has been running for approximately 25 seconds, the metal strip 7 on the tape short circuits the contacts Bo and Boo for approximately 1/10th of a second. This has no effect on rectifier SCR2, which was already cut off, and the recording amplifier RA remains inoperative.

Immediately after passing contacts Bo and Boo the metal strip 7 short circuits the contacts Po and Poo. However, since the contact Po is connected to contact a of relay RL2 and since the contact a is open-circuited, this has no effect.

Immediately after passing contacts Po Poo the strip 7 short circuits the contacts Co and Coo. This has the following results. First, the capacitor C3 is discharged across the gate of rectifier SCR2, via the contacts d and e of relay RL1 and the contacts Co and Coo. This switches on the rectifier SCR2 so that current can flow between power the supply lines PS1 and PS2 to energise the recording amplifier RA. Moreover, when the rectifier SCR2 conducts the voltage applied to the bases of transistors T1 and T3 becomes less positive. Transistor T3 is therefore cut off and the supply of current to the playback amplifier PA is terminated. Transistor T1 conducts and a positive voltage is applied to the gate of rectifier SCR1 from the emitter of transistor T1.

Charge from the capacitor C3 also flows via the contacts d and e of relay RL1, contacts Co and Coo, and contacts b and c of relay RL2 to the base of transistor T7. This causes the transistor T7 to conduct and apply a positive voltage to the base of the transistor T8, switching on the transistor T8. Current now flows between the power supply lines PS1 and PS2 via transistor T8 and contacts m and l of relay RL2, motor MS and contacts i and j of relay RL2. The motor MS is energised and the switching disc is rotated through a predetermined small angle, sufficient to move the pawl 35 into engagement with the associated ratchet wheel 33. The switching shaft 21 also rotates through a small angle, and the rack 27 engaging the pinion 25 at one end of the shaft is raised by an amount sufficient to bring the movable head MH into a position adjacent track 1 on the tape 1.

The machine is now in a condition suitable for recording an incoming message from the line L1 L2. This message is applied via the line transformer TR and the resistor R1 to the input of the recording amplifier RA. From the output of the amplifier RA the message is applied to the movable head MH, which is a combined playback and erase head, and is thereby recorded on track 1 of the tape.

The tape 1 now makes one complete traverse of its path, which takes approximately 30 seconds. During this time the incoming message is recorded on track 1. At the end of this period, the metal strip 7 again reaches and short circuits contacts Bo and Boo and causes rectifier SCR2 to be cut off. This causes power to be removed from the recording amplifier RA and supplied to playback amplifier PA. Additionally, a positive bias is applied to the base of transistor T1 and this transistor is cut off, thereby removing the positive bias on the gate of rectifier SCR1.

When the metal strip 7 short circuits the contacts Po and Poo there is no effect since these two contacts are disconnected from the circuit. When the strip 7 reaches contacts Co and Coo, the rectifier SCR2 remains cut off and, since there is no charge on capacitor C3, the transistors T7 and T8 are not switched on and the motor MS is not energised.

Since the fixed head AH remains connected to the input of the playback amplifier PA via contacts e and f of relay RL2, and since power is supplied to the playback amplifier PA, the machine is now in a condition to play back the closing text 5 to the line. This occupies approximately 5 seconds.

After the closing text 5 has been transmitted, the metal strip 7 on the tape 1 short circuits the contacts Ao and Aoo. This applies a short circuit across the rectifier SCR1, which is cut off. Accordingly, when the trailing edge of the strip 7 has moved beyond contact Ao the relay RL1 is de-energised. Contacts h and i of relay RL1 are opened, disconnecting the transformer TR from the line L1 L2. The contacts a and b of the relay RL1 are opened, disconnecting the battery from the recording amplifier RA, the playback amplifier PA, the remote control circuit RC and the motors M and MS. The inertia of the motor M ensures that the tape 1 is driven to a position where the metal strip 7 is disengaged from the contact Aoo.

As mentioned above, the owner of the present machine can arrange for messages recorded on trucks 1 to 15 to be played back to him by telephoning his own number from a remote location and transmitting an audio signal of predetermined frequency over the line from a portable transmitter. The playback operation is effected in the following manner.

First, the incoming ringing current on the telephone line L1 L2 causes the machine to operate and transmit the opening text recorded on track 16, in the manner described above. Whilst the machine is transmitting the opening text, the owner transmits the audio signal of predetermined frequency from his transmitter. The audio signal is applied via the line transformer TR to an input terminal 3 of the tone detector TD in the remote control circuit RC. This causes the output 8 of the detector TD to go low, switching on the transistor T4 and causing its collector electrode to assume a positive potential.

The positive potential at the collector of transistor T4 is applied to the gate of the rectifier SCR3, causing the rectifier to conduct via resistor R1. With rectifier SCR3 conducting, a negative going potential is applied from the anode of the rectifier to the base of transistor T1, switching on the transistor and causing a positive bias to be applied to the gate of rectifier SCR1. This positive bias prevents rectifier SCR1 from being switched off until rectifier SCR3 has been turned off by the opening of leaf contacts o, as hereafter described. With the rectifier SCR3 conducting a positive pulse is applied from the cathode of the rectifier via the capacitor C5 to the base of transistor T2. The transistor 2 conducts and the capacitor C3 is discharged.

The positive potential at the collector of transistor T4 is also fed via the contacts b and c of relay RL2 to the base of transistor T7. This causes the transistor T7 to conduct and apply a positive potential to the base of transistor T8, which also conducts. With the transistor T8 conducting, current is supplied from the power supply lines PS1 and PS2 to the stepping motor MS and the motor is energised. This rotates the switching shaft 21 so that the movable head MH is raised to a vertical location adjacent to the track which is immediately above the track bearing the last of the recorded messages.

The positive potential at the collector of transistor T4 is also developed across the capacitor C4 and applied to the base of transistor T5. Transistor T5 conducts and grounds the base of transistor T6. This cuts off the transistor T6 and prevents the relay RL2 from being energised, even though the rectifier SCR3 is conducting.

The charge on capacitor C4 leaks away via the emitter-base circuit of transistor T5. When the capacitor C4 is discharged the transistor T5 is switched off and the transistor T6 conducts. The relay RL2 is therefore energised.

Energisation of the relay RL2 causes contact $e$ to be connected to contact $d$, thus connecting the movable head MH to the input of the playback amplifier PA and disconnecting the fixed head AH from the playback amplifier. In addition, the contact $i$ of relay RL2 is disconnected from contact $j$ and connected to contact $h$ and the movable contact $l$ is switched from contact $m$ to contact $k$. This reverses the polarity of the connections to stepping motor MS.

The motor M is still energized and the tape 1 continues to be driven around the loop. Although the playback amplifier PA is still energised and the movable head MH is connected to line L1 L2 via this amplifier, the head is adjacent to the track above the last recorded message.

When the tape 1 has almost completed one traverse of the loop the metal strip 7 short circuits contact Bo and Boo. This applies a short circuit across rectifier SCR2, which was already turned off. In addition, capacitor C6 is connected between power supply lines PS1 and PS2 and is charged to the battery potential.

As movement of the tape 1 continues the metal strip 7 connects together contacts Po and Poo. The potential on capacitor C6 is then applied via the contacts Po and Poo and the contacts $a$ and $b$ of relay RL2 to the base of transistor T7. Transistors T7 and T8 conduct and current flows between the power supply lines PS1 and PS2 through the transistor T8, the contacts $h$ and $i$ of relay RL2, the stepping motor MS and the contacts $l$ and $m$ of the relay. The motor MS is energised and the movable head MH is moved down to a location adjacent the track bearing the last recorded incoming message.

When the metal strip 7 reaches contacts Co and Coo there is no effect on rectifier SCR2, since capacitor C3 has already been discharged via transistor T2, as described above. The playback amplifier PA remains energized and the recording amplifier RA remains cut off. The machine is therefore in a condition such that the last recorded message is transmitted back to the owner of the machine via line L1 L2 during the next movement of the tape around the loop.

When this last recorded message has been relayed to the owner and the tape 1 has almost completed its movement around the loop, the metal strip 7 again short circuits contacts Bo and Boo. This connects the capacitor C6 across the battery and charges the capacitor to the battery potential.

When the metal strip 7 short circuits contacts Po and Poo, capacitor C6 is again discharged via contacts Poo and Po and contacts $a$ and $b$ of relay RL1, applying a positive pulse to the transistor T7. Transistor T7 conducts and in turn switches on the transistor T8. The stepping motor MS is again energised and the movable head MH is moved down to a position adjacent to the last-but-one recorded message. This message is now transmitted to the line L1 L2.

The above described sequence of operations is repeated until the movable head MH has been stepped down to a position adjacent the blank track, track 0, which is the track below the incoming message first recorded. With the head MH in this position, the switching shaft 21 is in an angular position wherein the leaf contact switch 0 is opened by the associated cam 23 on the switching shaft. This turns off rectifier SCR3 and causes relay RL2 to be de-energised. The motor M remains energised and the closing text 5 is transmitted to the line L1 L2 since the fixed head AH is connected to the line via contacts $e$ and $f$ of relay RL2 and the playback amplifier PA.

When the rectifier SCR3 is switched off, the gate bias is removed from the rectifier SCR1 since transistor T1 is also switched off. Accordingly, when the metal strip 7 short circuits contacts Ao and Aoo the rectifier SCR1 is turned off, the relay RL1 is de-energised and the machine has been returned to a stand-by condition, ready to receive a further sequence of incoming calls.

If the owner of the machine delays transmitting an audio signal until the opening text 3 has been transmitted and the machine is switched into a condition for receiving an incoming message, the sequence of operations described above is modified in that transmission of the last recorded message is delayed until the tape 1 has been driven twice along its path.

When the machine is playing back recorded messages in the manner described above, the owner may wish to replay one or more of the messages which he has already heard. This can be achieved by operating the portable transmitter to transmit two or more pulses of audio signal from the remote location. The movable head MH is then stepped upwards by a number of steps which is one less than the number of pulses, in the following manner.

Assuming that the machine is in the playback mode, the first pulse of audio signal is applied to the input 3 of the tone detector TD and results in the output 8 going low, as described above. This action switches on the transistor T4 so that the collector electrode of the transistor assumes a positive potential, as also described above.

The positive potential at the collector of transistor T4 is applied to the contact $c$ of relay RL2, but since the relay is energised, contact $c$ is not connected to contact $b$ and the potential is not applied to transistor T7. The positive potential at the collector of transistor T4 is, however, applied to the base of transistor T5, which conducts and causes the transistor T6 to be switched off. This de-energises the relay RL2, whereupon the contacts associated with the relay are moved to the position shown in FIG. 2.

The time constant of the capacitor C4 and the base-emitter circuit of transistor T5 are such that transistor T5 conducts, the transistor T6 remains cut off and the relay RL2 remains de-energised for a period of time sufficient for the remaining pulses of audio signals to be received by the machine. Each time one of these signals is received a positive potential is applied from the collector electrodes of transistor T4 to the base of transistor T7, via the contacts b and c of relay RL2. Transistors T7 and T8 are therefore switched on each time a subsequent pulse of audio signal is received, and for each pulse the stepping motor MS is operated to raise the movable head MH from a position adjacent one track to a position adjacent the track immediately above.

Once the movable head MH has been brought up to the required track, the message on that track is played back to the line L1 L2 in the manner described above.

If the owner transmits a number of audio signals sufficient to cause the movable head MH to be raised above track 16, a leaf contact switch 16[1] is actuated by the associated cam 23 on the switching shaft 21. Leaf contact switch 16[1] (not shown in FIG. 4) is connected in series with the lead from the motor MS to the power supply line PS1. When the contacts of leaf switch 16[1] are opened, the motor MS is switched off and further upwards movement is prevented.

As mentioned above, the present machine includes further switches, not shown in FIG. 2, for effecting local operation of the machine.

Thus, to enable the owner to playback recorded messages the above-mentioned local playback switch LP has a first pair of contacts LP1 connected in parallel with the rectifier SCR1. When the switch LP is operated these contacts close and the gate of SCR1 becomes positive, SCR1 is turned on and relay RL1 is energised. Power is then supplied to amplifier circuit A and to the motor circuit M, as described above. Further contacts of the switch LP (not shown) operate to disconnect the output of the playback amplifier PA from the line L1 L2 and to connect the output to a loudspeaker, not shown. Finally, the relay RL2 is energised by the contacts LP2 of switch LP which short circuit rectifier SCR3 and transistor T6.

The machine then performs the same sequence of operations described above, the recorded messages being played back in the reverse order to that in which they were recorded. When the movable head MH reaches track 0 the leaf contact switch o opens and relay RL2 is de-energised, thereby moving the connections to motor MS to a condition wherein no further downwards movement of the head MH can take place.

To record the opening and closing texts 3 and 5, respectively, a second switch LP[1] is provided. This switch LP[1] has contacts (not shown) which operate to disconnect the input of recording amplifier RA from the line transformer TR and to connect the input to a microphone, not shown. Further contacts of switch LP[1] serve to disconnect the contacts Co and Coo from the answering circuit and to connect contact Co to contact Coo to contact Aoo.

Also provided is a start button, not shown, which, when operated, causes positive potentials to be applied to the gates of rectifiers SCR1 and SCR2. Finally, there is a further switch which is connected in parallel with transistor T6 and rectifier SCR3 and which, when operated, causes relay RL2 to be energised.

With these switches operated the tape 1 is driven along the loop and the owner records the opening text 3 via the microphone. A visual indication is provided when the end of the period reserved for recording the opening text 3 has been reached. The tape then stops. The start button is then pressed again and the tape 1 continues to traverse the loop until the metal strip 7 short circuits contacts Co and Coo, when the relay RL1 is de-energised and the motor M is switched off. The owner now presses the start button again and records the closing text 5. When the metal strip 7 short circuits the contacts Ao and Aoo the relay RL1 is again de-energised and motor M is switched off.

In a modification of above machine the stepping motor MS which moves the movable head MH upwardly and downwardly is connected in series with a silicon controlled rectifier and the series circuit so formed is connected between the lines PS1 and PS2. Connected in parallel with the series circuit is a storage capacitor of 3000μF. From the gate of the rectifier a connection is made to a source from which a pulse is applied to the rectifier each time the head MH has to be moved.

In use, the storage capacitor is charged to the battery potential from the lines PS1 and PS2. When a pulse is applied to the gate of the rectifier the rectifier is rendered conductive and charge from the capacitor flows through the motor MS and the rectifier. The motor is therefore operated to move the head MH upwardly or downwardly. Current flow through the motor MS ceases as soon as the voltage on the capacitor has fallen below the value necessary to maintain conduction of the rectifier.

This modified circuit has the advantages that it has a self re-setting action and that it avoids large current surges from the battery.

In a further modification of the machine a device is provided for detecting when the endless tape has been broken or has become jammed in the machine. The device is sensitive to the level of direct current flowing in the playback amplifier PA when an incoming ringing current has been received and the machine has been switched to a condition for playing back the opening announcement text 3. If the d.c. level is low, indicating that the text 3 is not being transmitted, the device generates pulses which are applied to the stepping motor MS. The motor operates to move the movable head MH upwardly to a position adjacent to track 16 on the tape 1. This corresponds to the situation where the tape is filled with recordings of incoming messages and further operation of the machine is inhibited.

The machine can also be modified by using two solenoids in place of motor MS.

In a further modification of the above machine, one or more of the pairs of contacts Bo Boo, Po Poo and Co Coo in the above machine is removed and the machine provided with a timer. The latter is connected into the control circuit in such manner that it is triggered by capacitor C3 when SCR1 is energised. Output pulses are provided by the timer at predetermined intervals of time after triggering, these pulses being applied to other parts of the circuit so as to effect corresponding switching operations to those performed by the closing of contacts Bo Boo, Po Poo and Co Coo. For example, after 25 seconds time delay a pulse from the timer triggers rectifier SCR2.

Although the tape 1 used in the above machine had fifteen tracks available for recording incoming messages it will be appreciated that a greater or lesser number may be provided. Irrespective of the total number of tracks which are provided the final track, track 15 in the case of tape 1, above, can bear a pre-recorded announcement to the effect that all tracks are full and that the caller should phone back later. This accouncement is played back to the line each time an incoming ringing current is received by the machine.

In a further machine according to the invention, the recording medium is a single taut band or tape provided with means operative on each rotation of the band to cause the band or an associated recording and reproducing head to move in a lateral direction, across the width of the band, so that the head is aligned with a different track on the band during different revolutions of the band.

The tape itself may be physically modified to trigger the movement, e.g. by means of one or more perforations in the tape and/or notches in the edge of the tape. Alternatively or in addition a separate triggering element may be attached to the tape. The revolution of the tape may be sensed electrically, magnetically, mechanically, or in any other convenient way to provide the desired traversing movement before or after each revolution of the tape.

The use of a taut tape makes it possible for the tape itself to be used as a driving or trigger element for initiating the lateral movement and the power for effecting the movement can be obtained directly from power supplied by the tape drive mechanism. This can substantially simplify the operation and construction, and hence the cost, of preparing the machine, compared with known arrangements.

In general, the tape will revolve but will not take part in the traversing movement, which will be effected by means of a mechanical selector which locates the single recording and reproducing head over the correct track of the tape. The band or tape can effectively act as an escapement mechanism to initiate the operation of the mechanical track selector using power obtained directly from the tape drive mechanism.

On each rotation of the tape the head is directly driven across the tracks.

The same head can be used both for replaying and recording the next track and for replaying and recording the message tracks. In this case, the selector mechanism automatically places the head over the text track when a telephone call is received, for a first rotation of the tape band, and then moves the head to a free message track. Alternatively, the head is constrained always to track the text when a call is received, and the selector preselects the track on which the messages are to be recorded but the head is not permitted to move to that track until after the first "text" revolution.

A reversing mechanism is provided so that during replaying of the messages the direction of traverse from track to track is the reverse of that during recording; it is to be understood that in general successive messages will be recorded on adjacent tracks.

As already indicated, the drive from the tape to the head may be a direct mechanical drive, or an electromagnetic drive may be used.

In place of the metal strip 7 a section of the tape 1 can be made conductive. Alternatively, the metal strip 7 and the associated contacts Ao, Aoo, Bo, Boo, Co, Coo, Po and Poo can be replaced by other switching arrangements. For example, a light source can be arranged to project a beam of light on to the tape and a photosensitive device arranged to detect a change in the intensity of light transmitted by or reflected from the tape each time a section of tape having different optical properties from the remainder of the tape moves past a predetermined location. The resulting charge in current through the device is then used to operate switches in the electrical control circuit of the machine. Alternatively, a section of the tape may be provided with means which actuate a magnetic, electrical or mechanical sensing device when they reach the predetermined location. A further machine according to the invention has a stationery "multi-track" head in place of the movable head MH in the machine described above. The multi-track head is formed of 16 individual heads, each associated with a respective one of the tracks on an endless tape. The individual heads are formed as a single assembly which is mounted on the tape deck of the machine with each head adjacent to the associated track. Associated with the multi-track head are switching circuits which effect electrical connections to respective heads so that incoming messages are recorded on respective tracks in sequence.

Although a sound recording and a reproducing machine according to the invention may be a telephone answering machine it could also be some other machine in which a series of messages or other items of information has to be recorded on a recording medium and subsequently replayed.

A further machine according to the invention will now be described with reference to FIGS. 5A, B and C of the drawings. This machine is a modification of the machine shown in FIGS. 1 to 4, having a simplified mechanism for moving a recording and reproducing head laterally of a tape and mechanically operated switches which allow a single amplifier A to be used in place of amplifiers RA and PA.

Figure 5A:
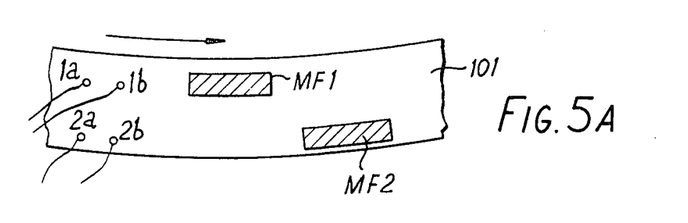
FIG. 5A is a diagrammatic illustration of a section of a second embodiment of an endless tape which may be used in a machine according to the invention.

Referring to FIG. 5A, the present machine is designed for use with an endless tape 101 having one track reserved for recording a telephone answering text and fiften tracks for recording incoming messages. The answering text is made up of an opening text only. In place of the metal strip 7 on the tape 1, two metal foils MF1 and MF2 are provided on the tape 101. The foils MF1 and MF2 are spaced lengthwise of the tape 101 and associated with respective pairs of electrical contacts 1a, 1b and 2a, 2b.

In the present machine a fixed head (not shown) is again provided for use in recording and reproducing the answering text. A movable head H is provided for recording and reproducing incoming messages.

Figure 5B:
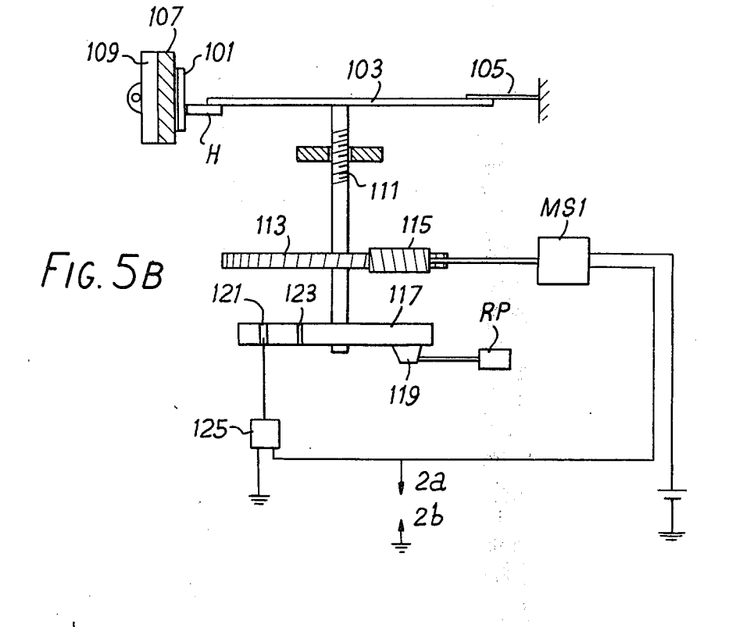
FIG. 5B is a diagrammatic illustration of an arrangement for supporting and moving a head which is to be positioned adjacent the tape shown in FIG. 5A.

Referring to FIG. 5B, the head H is secured to one end of a generally horizontal plate 103 and the other end of the plate is mounted on a wall upstanding from the tape deck of the machine by means of a plate 105 of spring steel. The head H is disposed adjacent to the tape 101 and is movable upwardly and downwardly (as hereinafter described) to positions adjacent to respective tracks on the tape. In each position of the head H the tape 101 is engaged between the head and a felt pad 107 which is mounted on a self centering bracket 109.

To enable the head H to be moved relative to the plate 103 it is biased into engagement with an upper end of an upright shaft 111 and a worm wheel 113, mounted on the shaft 111, is engaged by a worm 115. The worm 115 is secured to the output shaft of a motor MS1, which replaces the motor MS of FIGS. 1 to 4. The motor MS1 is connected in an electrical circuit hereinafter described.

A switching wheel 117 is also secured to the shaft 111 and a record/playback swith RP is mounted adjacent to the wheel so that an operating member of the switch is operated by a cam 119 on the wheel, as hereinafter described. The switch RP has a first series of contacts for connecting the amplifier A in a condition suitable for recording incoming messages or reproducing the answering text, a second series of contacts for connecting either the fixed head or the movable head H to the amplifier A, and a further pair of contacts, hereinafter described.

Two indents 121 and 123, respectively, are formed in the periphery of the switching wheel 117 at locations angularly spaced by approximately 10°. An operating member of a microswitch 125 is biased into engagement with the periphery of the wheel 117.

As shown in FIG. 5B, one pole of the motor MS1 is connected to a positive terminal of a battery which has its negative terminal connected to earth potential. The other pole of the motor is connected to earth potential via contacts 2a and 2b of FIG. 5A and is also connected to earth via the contacts of the microswitch 125.

Figure 5C:
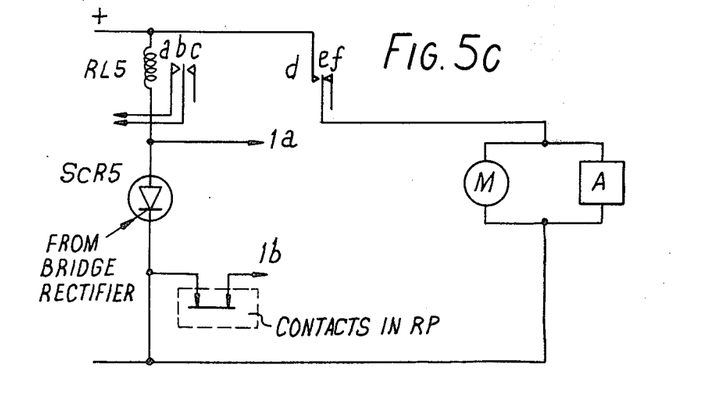
FIG. 5C is a schematic diagram of an electrical control circuit suitable for practicing the present invention.

Referring now to FIG. 5C of the drawings, the electrical control circuit of the present machine includes a silicon controlled rectifier SCR5 which corresponds to the rectifier SCR1 of FIG. 4. As in the case of rectifier SCR1, a gate electrode of rectifier SCR5 is connected to an output of a bridge rectifier (not shown) which in turn is connected to a telephone line. A winding of a relay RL5, which corresponds to relay RL1, connects the anode of rectifier SCR5 to the positive terminal of a battery and the cathode of the rectifier is connected to the negative terminal. The relay RL5 has a first set of contacts a b c corresponding to contacts g h i of relay RL1 and a second set of contacts d e f for connecting a tape driving motor M and the amplifier A across the battery terminals.

The contact 1a of FIG. 5A is connected to the anode of rectifier SCR5 and contact 1b is connected via the further pair of contacts on the switch RP, referred to above, to the cathode of the rectifier.

When the present machine is connected for use but in a standby condition the tape 101 is in the position shown in FIG. 5A, where the metal foils MF1 and MF2 has just passed the associated contacts 1a, b and 2a, b, respectively. The contacts of relay RL5 are in the condition shown in FIG. 5C. The contacts of the switch RP are in conditions such that the fixed head is connected to the amplifier A, the amplifier is in a condition suitable for reproducing the answering text, and the further pair of contacts are closed. The operating member of the microswitch 125 is engaged in the indent 121 and the contacts of the switch are open.

When an incoming ringing current is applied to the present machine from the telephone line a d.c. voltage is applied to the gate of rectifier SCR5, the relay RL5 is energised, and the contacts of the relay are operated to connect the motor M and amplifier A between the battery terminals and to provide a d.c. path across the telephone line. With the motor M energised and the various amplifier and head connections in the conditions described above, the tape 101 is driven around its loop and the answering text recorded on the tape is transmitted via the telephone line.

When the tape 101 has almost completed one traverse of the loop, and the end of the answering text has been reached, the foil MF2 short circuits contacts 2a and 2b. This causes operation of the motor MS1 to rotate the worm 115, and hence to rotate the shaft 111 and the switching wheel 117.

Rotation of the switching wheel 117 disengages the cam 119 from the operating member of the switch RP. This connects the movable head H to the amplifier A in place of the fixed head, switches the amplifier A to a condition suitable for recording an incoming message, and opens the further pair of contacts in the switch RP.

Rotation of the switching wheel 117 also causes the operating member of the microswitch 125 to be disengaged from the indent 121, closing the contacts of the switch. This means that current continues to be supplied to the motor MS1 after the foil MF2 has moved beyond the contacts 2a, b.

When the switching wheel 117 has moved through approximately 10° the operating member of the switch 125 engages the indent 123, opening the contacts of the switch and disconnecting the motor MS1 from the battery. The rotation of the shaft 111 therefore ceases.

The rotation of the shaft 111 which has taken place has been accompanied by a small movement of the shaft in an axial direction, and engagement been the shaft and the plate 103 has been sufficient to bend the spring plate 105 by a small amount, thereby to effect a small movement of the head H laterally of the tape 101. This movement of the head H means that the head is slightly offset from the optimum recording position but by an amount which is not significant.

Continued rotation of the tape causes the metal foil MF1 to short circuit the contacts 1a, b. Since the further pair of contacts in the switch RP are open, this has no effect.

The tape 101 now proceeds to traverse its loop for a second time, and during this time an incoming message is recorded on the tape.

When the tape 101 has almost completed its second traverse the contacts 2a, b are again short circuited by the foil MF2. This causes the motor MS1 to be energised to rotate the shaft 111 and the switching wheel 117. Rotation of the switching wheel 117 disengages the operating member of switch 125 from the indent 123 so that the contacts of the switch are closed and the motor MS1 remains energised even after the foil MF2 has moved beyond contacts 2a, b. The shaft 111 and wheel 117 continue to rotate therefore until the wheel has returned to the standby position of FIG. 5B, where the operating member of switch 125 is re-engaged with the indent 121 and current supply to the motor MS1 is cut off.

With the switching wheel 117 in the position shown in FIG. 5B the operating member of the switch RP is again engaged with the cam 119 so that the contacts of the switch return the fixed and movable heads and the amplifier to conditions suitable for playing back the answering text. The further pair of contacts on the switch RP are closed.

When the metal foil MF1 reaches the contacts 1a, b a short circuit is placed across the rectifiers SCR5, cutting off the rectifier. Current continues to flow through the winding of relay RL5, via contacts 1a, b and the further pair of contacts in switch RP, until the foil MF1 has moved beyond contacts 1a, b. When this has happened the relay RL5 is de-energised, the contacts of the relay are switched to the condition shown in FIG. 5C, and the tape driving motor M is cut off.

The machine of FIGS. 5A, B and C includes further circuits, not shown, which enable recorded messages to be played back to the owner of the machine in the reverse order from which they were recorded. This can be done by operating controls provided on the machine or by transmitting audio signals from a remote location.

The circuits employed in operating the machine from a remote location include a tone detector corresponding to the tone detector TD of FIG. 4, transistor circuits corresponding to those for transistors T1, T4 and T5, and a relay corresponding to relay RL2. This relay has contacts for reversing the polarity of the connections to the motor MS1, corresponding to contacts h . . . m of relay RL2. The present control circuit also includes a second microswitch whose operating member engages a further switching wheel on the shaft 111, this further wheel having only a single indent in place of indents 121 and 123. The second microswitch is connected in a circuit with the motor MS1, the battery and contacts 2a, b and is connected into the circuit by operation of further contacts in the relay corresponding to relay RL2. Still further contacts in the relay serve to connect the moving head H to the amplifier when the machine is required to play back recorded messages.

In operating the present machine from a remote location an audio signal is transmitted over the telephone line whilst the answering text is being transmitted. This signal is detected by the tone detector, which produces an output signal to operate the relay corresponding to relay RL2. The second microswitch is now connected in the circuit in place of microswitch 125, the connections to the amplifier and heads are changed so that recorded messages can be played back via the movable head H, and the polarity of battery connections to the motor MS1 are reversed.

The tape 101 is now driven around the loop and the last of the incoming messages recorded on the tape is transmitted to the telephone line. When the message has been transmitted and the tape has almost completed its traverse, the contacts 2a, b are short circuited by the foil MF2. The motor MS1 is now energised and the shaft 111 and switching wheels are rotated. When the second switching wheel has completed one revolution, thereby moving the head H down to a position adjacent the track on which the last but one incoming message was recorded, the operating member on the second microswitch re-engages the indent on the second switching wheel. Movement of the head H then ceases.

A further switch is provided on the present machine and is operated by the head H when the head reaches the last track on the tape. Operation of the further switch causes the relay corresponding to relay RL2 to be de-energised and the various contacts of the relay to be returned to their initial conditions. The transistor T1 ceases to hold the gate of rectifier SCR1. When the foil MF1 next short circuits contacts 1a, b the machine is cut off.

For local playback the operation of the machine is similar to that for remote playback except that the output of the amplifier A is connected to a loudspeaker.

The audio signal employed in operating the above machines from a remote location is generated by an oscillator coupled to a loudspeaker, which is arranged close to the telephone mouthpiece at the remote location.

What we claim is:

1. A sound recording and reproducing machine in which information is recorded on an endless recording medium in a series of tracks which extend lengthwise of the medium at locations mutually spaced in a direction laterally of the medium, the machine comprising sound recording and reproducing means, means for driving the recording medium along a predetermined path within which information is recorded on or reproduced from the medium by the recording and reproducing means, and control means adapted, when a plurality of electrical signals each representing information are applied to the machine in sequence, to actuate the driving means and the sound recording and reproducing means so that the said tracks are formed in a predetermined order, and further adapted, when an electrical command signal for reproducing the information is applied to the machine, to actuate the driving means and the sound recording and reproducing means so that the recorded information is reproduced from the tracks in the reverse order from the order in which the tracks were formed.

2. A sound recording and reproducing machine as claimed in claim 1, wherein the sound recording and reproducing means comprise a first sound recording and reproducing head for use in forming the said tracks of recorded information on the recording medium, and means for effecting relative movement between the first head and the recording medium in a direction laterally of the medium.

3. A sound recording and reproducing machine as claimed in claim 2, wherein the control means actuate the sound recording and reproducing means so that the information represented by each of the electrical signals is recorded on a respective one of the said tracks, the said means for effecting relative movement causing a stepwise relative movement between the first head and the recording medium between the formation of adjacent tracks and between the reproduction from adjacent tracks.

4. A sound recording and reproducing machine as claimed in claim 3, wherein the said means for effecting relative movement comprise ratchet and pawl means coupled to the first recording and reproducing head, and means adapted, when one of the electrical signals is received, to operate the ratchet and pawl means in a first sense, thereby to cause relative movement in a predetermined direction between the first recording and reproducing head and the medium, and further adapted, when an electrical command signal is applied to the machine, to operate the ratchet and pawl means in a second, opposed sense, thereby to cause relative movement in the opposite direction between the first head and the medium.

5. A sound recording and reproducing machine as claimed in claim 4, wherein the ratchet and pawl means comprise a pair of ratchet wheels mounted on a common shaft which is coupled to the first head, and pawls associated with respective ratchet wheels, the arrangement of the ratchet wheels and pawls being such that actuation of one pawl causes engagement thereof with the associated ratchet wheel, thereby to rotate the shaft in one sense, whilst actuation of the other pawl causes engagement thereof with the associated ratchet wheel, thereby to rotate the shaft in the opposite sense.

6. A sound recording and reproducing machine as claimed in claim 5, wherein an electric motor is provided for actuating the pawls, the pawls being coupled to an output shaft of the motor in such manner that rotation of the output shaft through a predetermined angle in one sense causes engagement of the said one pawl with the associated ratchet wheel whilst rotation of the output shaft through a predetermined angle in the reverse sense causes engagement of the said other pawl with the associated ratchet wheel.

7. A sound recording and reproducing machine as claimed in claim 1, wherein the control means are adapted, when recorded information is being reproduced from the said tracks in the reverse order, and a further, predetermined command signal is applied thereto to actuate the driving means and the sound recording and reproducing means so that information recorded on one or more tracks already reproduced is again reproduced.

8. A sound recording and reproducing machine as claimed in claim 1 for use with an endless recording medium having an answering text recorded on a first track thereof, wherein the control means are adapted, when an incoming ringing current is applied to the machine, to actuate the driving means and the sound recording and reproducing means so that the said answering text is first reproduced, and subsequently, when one of the said electrical signals is received, to actuate the driving means and the sound recording and reproducing means so that information represented by the said signal is recorded to form a further track on the medium.

9. A sound recording and reproducing machine as claimed in claim 8 for use with an endless recording medium having an opening answering text and a closing answering text recorded on the said first track, wherein the control means are adapted to actuate the driving means and the sound recording and reproducing means so that only the opening answering text is reproduced when an incoming ringing current is applied to the machine and the closing answering text is reproduced after information represented by the said signal has been recorded to form the further track.

* * * * *